United States Patent [19]
Vuillermoz

[11] Patent Number: 5,174,547
[45] Date of Patent: Dec. 29, 1992

[54] BUTTERFLY VALVE FOR LIMITING SUDDEN VARIATIONS IN GAS FLOW ALONG A DUCT

[75] Inventor: Jean-François Vuillermoz, Annecy le Vieux, France

[73] Assignee: Alcatel Cit, Paris, France

[21] Appl. No.: 769,702

[22] Filed: Oct. 2, 1991

[30] Foreign Application Priority Data

Oct. 2, 1990 [FR] France .................. 90 12120

[51] Int. Cl.⁵ ........................ F16K 1/22; F16K 47/02
[52] U.S. Cl. ..................................... 251/305; 251/120
[58] Field of Search .................. 251/305, 308, 120

[56] References Cited

U.S. PATENT DOCUMENTS

| | | | |
|---|---|---|---|
| 1,852,918 | 4/1932 | Chandler et al. | 251/305 |
| 2,095,263 | 10/1937 | Moss | 251/305 |
| 2,200,723 | 5/1940 | Reichhelm et al. | |
| 3,026,893 | 3/1962 | McCarthy | |
| 3,070,345 | 12/1962 | Knecht | 251/305 |
| 3,238,955 | 3/1966 | Lassiter, Jr. | 251/305 |
| 3,442,489 | 5/1969 | Cary et al. | 251/305 |
| 3,770,242 | 11/1973 | O'Connor | 251/305 |
| 4,194,722 | 3/1980 | Okerblom | 251/305 |
| 4,962,783 | 10/1990 | Ball et al. | 251/305 |
| 4,967,778 | 11/1990 | Ball et al. | 251/305 |
| 5,067,506 | 11/1991 | Ball et al. | 251/305 |

FOREIGN PATENT DOCUMENTS

| | | |
|---|---|---|
| 1435487 | 12/1966 | France . |
| 2236147 | 1/1975 | France . |
| 2276524 | 1/1976 | France . |
| 1533073 | 8/1978 | United Kingdom . |

Primary Examiner—George L. Walton
Attorney, Agent, or Firm—Sughrue, Mion, Zinn, Macpeak & Seas

[57] ABSTRACT

A butterfly valve for limiting sudden variations in gas flow along a duct, the valve comprising a fixed coupling body between two duct ends or between one duct end and a volume, the body constituting a ring whose inside diameter is close to that of the duct, wherein the fixed body is fitted internally with a flap having a circular developed surface, the flap pivoting freely about a diametral shaft, the flap not being plane, but forming a dihedral angle along a ridge that constitutes a chord of the circular developed surface of the flap, the flap being free to rotate without friction relative to the fixed body, and wherein the flap is heavier on one side of the axis than on the other, with the position of the flap resulting from equilibrium between the force due to gravity and the force exerted on the flap by the action of any gas flow, with a flow of gas having the effect of causing the flap to pivot in such a direction as to throttle the duct.

5 Claims, 2 Drawing Sheets

BUTTERFLY VALVE FOR LIMITING SUDDEN VARIATIONS IN GAS FLOW ALONG A DUCT

The present invention relates to a butterfly valve for avoiding sudden variations in gas flow along a duct.

The invention is particularly applicable to pipework used in vacuum applications, and it serves to protect mechanisms that are sensitive to "hammer", or to avoid sweeping up particles inside installations due to gases moving too fast, e.g. when a vacuum pump is started.

BACKGROUND OF THE INVENTION

A prior art butterfly valve consists in a cylinder ring with shoulders for mutually positioning two pipework ends disposed end-to-end. An O-ring is disposed between the two pipework ends around the outside surface of the ring.

The inside diameter of the circular ring includes a narrowing that forms a shoulder. The shoulder narrows the nominal diameter of the duct. Two circular half-flaps are disposed inside the ring to pivot about a diametral axis. In the closed position, the two half-flaps bear against the shoulder and they are urged towards an open position by a helical torsion spring threaded over the axis. When no force is applied thereto, both half-flaps are therefore open and together they form a V with the extent to which the two branches of the V can move together being limited by a metal tab formed on each of the half-flaps and bearing against the wall of the duct.

Such a butterfly valve is effective in preventing a "hammer" shock wave from propagating or for preventing particles being swept up by too great a flow of gas; however, the use of a spring prevents the lifetime of the mechanism being very long if the flaps are moved frequently. In the event of the spring breaking, the valve no longer opens and there is a severe danger of damage to items situated downstream from the device. Under such circumstances, this cannot be accepted.

SUMMARY OF THE INVENTION

An object of the invention is thus to mitigate this drawback. The present invention provides a butterfly valve for limiting sudden variations in gas flow along a duct, the valve comprising a fixed coupling body between two duct ends or between one duct end and a volume, said body constituting a ring whose inside diameter is close to that of the duct, wherein said fixed body is fitted internally with a flap having a circular developed surface, the flap pivoting freely about a diametral shaft, said flap not being plane, but forming a dihedral angle along a ridge that constitutes a chord of the circular developed surface of the flap, the flap being free to rotate without friction relative to said fixed body, and wherein said flap is heavier on one side of the axis than on the other, with the position of the flap resulting from equilibrium between the force due to gravity and the force exerted on the flap by the action of any gas flow, with a flow of gas having the effect of causing the flap to pivot in such a direction as to throttle the duct.

In a particular embodiment of the present invention, said flap is constituted firstly by a plane sheet occupying more than a semicircle and less than a circle, and secondly by a weight fixed to that portion of said sheet which is situated on the same side of the shaft as the side where the sheet is interrupted along a chord prior to completing the circle, one of the surfaces of the said weight constituting the second surface of the said dihedral angle formed by the flap, with the first surface thereof being constituted by said sheet.

In another embodiment, said flap is constituted by a circular sheet folded along a chord, one of the two portions of the sheet folded in this way being ballasted by an unbalanced weight.

According to another feature, the ridge of said dihedral angle constitutes a chord passing through the center of the circular developed surface of said flap.

BRIEF DESCRIPTION OF THE DRAWINGS

Embodiments of the invention are described by way of example with reference to the accompanying drawings, in which.

DETAILED DESCRIPTION

Figure 1:
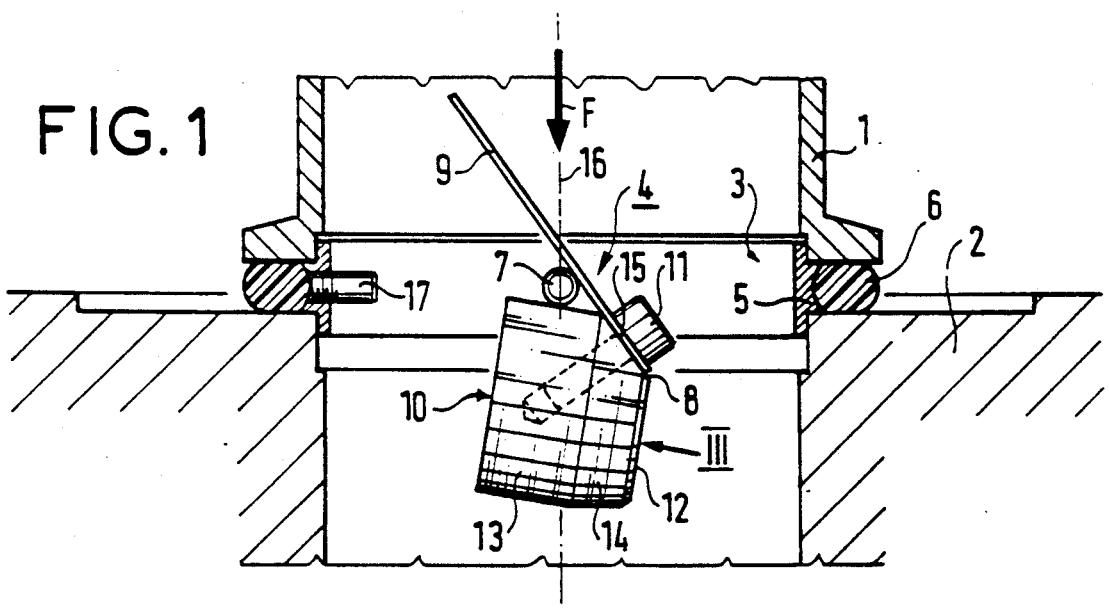
FIGS. 1 and 2 are a section view and a plan view showing a butterfly valve of the invention.
Figure 2:
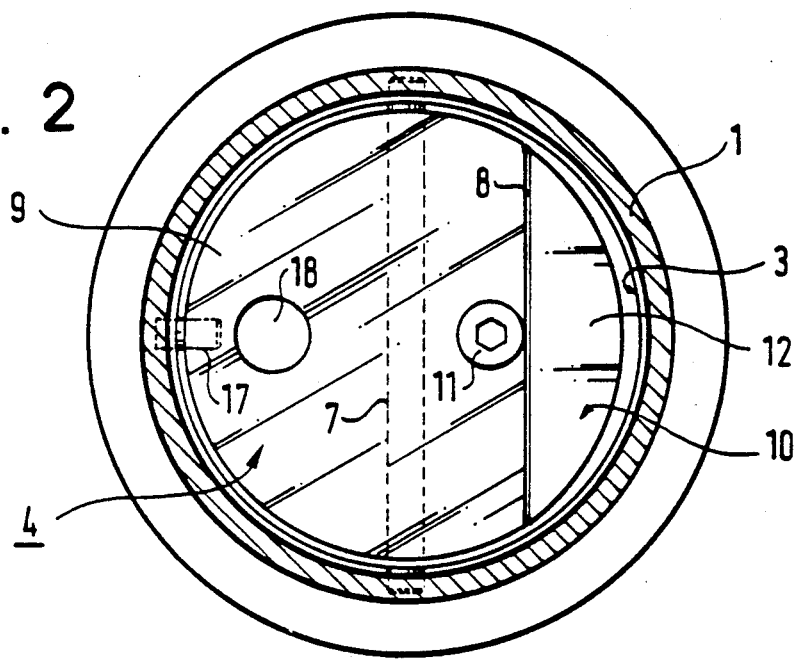
Figure 3:
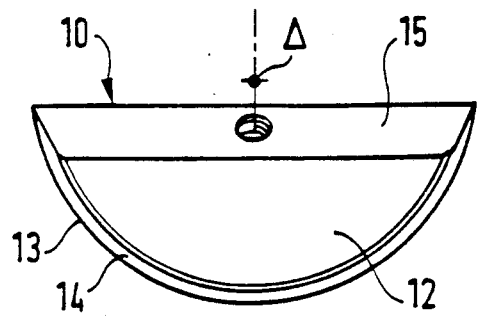
FIG. 3 is a detail view showing the weight as seen in the direction of arrow III in FIG. 1.

With reference to FIGS. 1 to 3, a butterfly valve can be seen disposed between the end of a duct 1 and a volume 2. The butterfly valve comprises a fixed coupling body 3 and a pivoting flap 4. The fixed coupling body 3 comprises a ring having an outside shoulder 5 for positioning the body between the duct 1 and the volume 2. An O-ring 6 is disposed around the fixed body 3 between the end of the duct 1 and the volume 2. The inside diameter of the fixed body 3 is very close to that of the duct 1.

The flap 4 is mounted to pivot inside the fixed body 3. It is fixed to a diametral shaft 7 which rotates freely at its ends in bores formed in the body 3. The developed shape of the flap 4 is circular, but the flap is not plane, being folded so as to form a ridge along a chord 8 of the circular developed surface of the flap 4. The flap 4 thus comprises a plane sheet 9 occupying more than a semicircle but less than a complete circle, and a weight 10 fixed by means of a screw 11 to that portion of the sheet 9 which is situated on the same side of the shaft 7 as the plane of the flap 4 meets the chord 8. The area 12 of the weight 10 constitutes a portion of a circle delimited by the chord 8 and constitutes the second portion of the flap 4 whose first portion is constituted by the sheet 9, with the portions 9 and 12 forming a dihedral angle such that the ridge line between them constitutes the chord 8 of the developed circle constituting the full flap 4.

The weight 10 constitutes an unbalance weight for the flap 4. The weight comprises a cylindrical portion 13 about the axis Δ together with a chamfered conical portion 14. A flat 15 is formed on the conical portion 14 for the purpose of fixing the weight to the sheet 9. The position in three dimensions of the assembly is as shown in FIG. 1, i.e. the axis 16 of the duct is vertical. Thus, in the absence of any pressure difference between the upstream and downstream sides of the valve, the weight 10 holds the valve open. When gas flows in the direction of arrow F, the flap 4 takes up an equilibrium position and the greater the jolt on pump start-up, the greater the extent to which the flap is closed, thereby limiting the flow of gas and the effects of "hammer". A screw 17 is screwed into the inside of the ring 3 so as to serve as an abutment that limits the extent to which the flap 4 can rotate in the closure direction.

FIG. 2 shows the device in the orientation of FIG. 1 and a seen from above, with the flap 4 in its position for closing the duct 1 to the maximum extent, i.e. the flap is in abutment against the screw 17. As can be seen in the figure, this provides throttling, but not total closure. The requirement is to limit flow, not to prevent it. Clearance is therefore provided between the flap 4 and the inside wall of the fixed body 3.

FIG. 2 also shows a hole 18 formed through the sheet 9. This hole serves to adjust the equilibrium position of the flap. Such adjustment is performed experimentally during testing.

Figure 4:
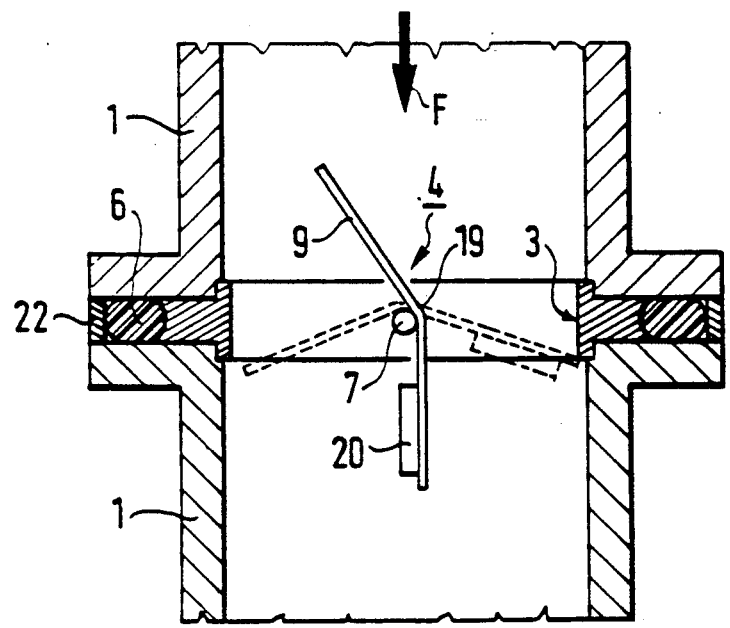
FIG. 4 is a diagrammatic view of a variant of the invention.

FIG. 4 is a diagram showing a variant in which the device is situated between the ends of two pieces of duct 1. In this variant, the entire flap 4 is constituted by a circular sheet 9 which is folded along a diameter 19. An unbalance weight 20 is fixed to one of the branches of the sheet 9.

In this variant there is no stop abutment in the closed position.

Figure 5:
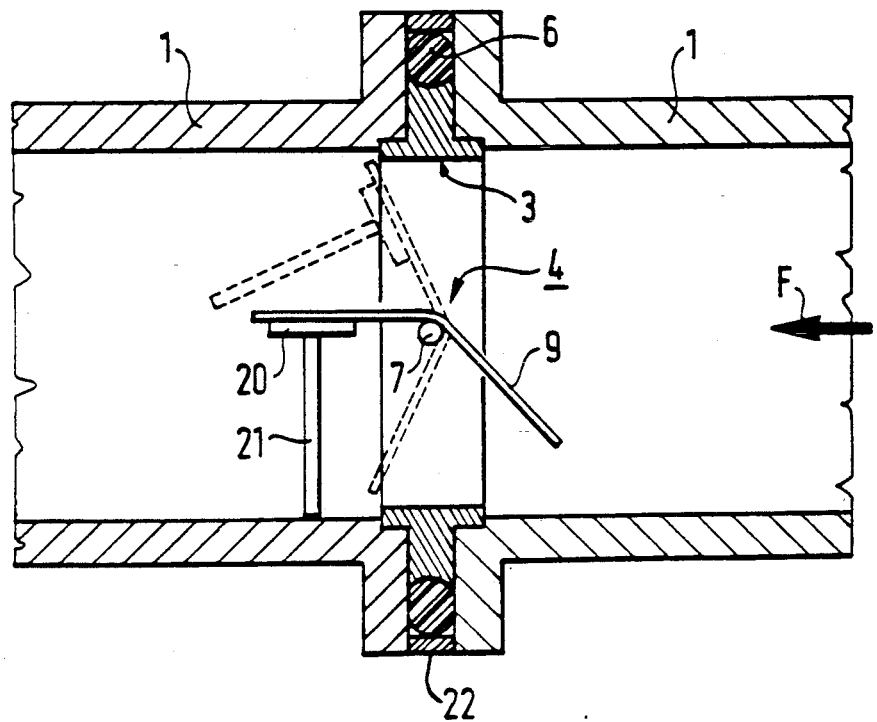
FIG. 5 shows another variant of the invention.

FIG. 5 shows another example where the axis of the duct is horizontal. In this case, the unbalance weight 20 has an abutment leg 21 for limiting the extent to which the flap 4 tilts when in its open position.

In FIGS. 4 and 5, the respective positions of maximum closure are shown in fine dashed lines. In addition, both of these figures show a retaining ring 22 disposed around the O-ring 6.

The major advantage of the invention lies in the robustness of its mechanism. It is subject neither to bending nor to deformation, but only to rotary motion of the flap under the effect of a flow. It is therefore entirely suitable for use in systems where a valve of this kind is required to operate a large number of times.

A second advantage lies in its large flow cross-section since it has the same dimensions as a standard coupling component for pipe work. This improves its effectiveness at low pressure in vacuum circuits.

Finally, and because it uses a mass to set up an equilibrium position, the size of its opening can be adjusted for extremely small pressure differences. In addition, unlike prior systems that require the flow to vary suddenly before they close, the system described above may be caused to close by a slow increase of said difference. It thus protects the mechanism under all circumstances.

I claim:

1. A butterfly valve for limiting sudden variations in gas flow along a duct, said valve comprising: a fixed coupling body between two duct ends or between one duct end and a volume, said body constituting a ring having an inside diameter close to that of the duct, a flap having a circular developed surface fitted internally of said ring on a diametrical shaft, said flap pivoting freely about said diametrical shaft, said flap not being plane and forming a dihedral angle along a ridge constituted by a chord of the circular developed surface of the flap, said flap being free to rotate without friction relative to said fixed body, and a weight disposed on one side of said flap such that said flap is heavier on one side of the axis of the shaft than on the other, and at least one of said flap and said weight defining a throttle passageway between the side of the flap bearing said weight and the interior wall of said ring, with the position of the flap resulting from equilibrium between the force due to gravity and the force exerted on the flap by the action of any gas flow, and with a flow of gas having the effect of causing the flap to pivot to a substantially closed position to throttle gas flow through said passageway thereby limiting the effect of hammer or valve shock.

2. A butterfly valve according to claim 1, wherein said flap is constituted firstly by a plane sheet occupying more than a semicircle and less than a circle, and said weight is fixed to that portion of said sheet which is situated on the same side of the shaft as the side where the sheet is interrupted along a chord prior to completing the circle, one of the surfaces of the said weight constituting the second surface of the said dihedral angle formed by the flap, with the first surface thereof being constituted by said sheet.

3. A butterfly valve according to claim 1, wherein said flap is constituted by a circular sheet folded along said chord, and said weight is fixed to one of two portions of the folded sheet such that said flap is ballasted by said weight.

4. A butterfly valve according to claim 1, wherein the ridge of said dihedral angle constitutes a chord passing through the center of the circular developed surface of said flap.

5. A butterfly valve according to claim 2, wherein the ridge of said dihedral angle constitutes a chord passing through the center of the circular developed surface of said flap.

* * * * *